Patented June 15, 1948

2,443,206

UNITED STATES PATENT OFFICE 2,443,206

PREPARATION OF PHENYLALKYLAMINES WITH EXCESS CONDENSING AGENT

Chester M. Suter, Albany, N. Y.

No Drawing. Application May 5, 1944, Serial No. 534,350

8 Claims. (Cl. 260—570.8)

This invention is concerned with aryl-substituted aliphatic amines in which the aryl group is attached to a tertiary carbon of the aliphatic residue of the amines, and particularly to the preparation of such aryl-substituted aliphatic amines by direct condensation of an aromatic compound having a reactive hydrogen atom with an amino tertiary alcohol in the presence of a stoichiometric excess of a condensing agent which brings about the condensation of the tertiary hydroxyl group of the amino tertiary alcohol with the reactive hydrogen of the aromatic compound (the condensing agent causing removal of water of condensation), and the resulting aryl radical attaching itself through the nuclear carbon atom from which the reactive hydrogen was removed to that carbon atom of the original amino tertiary alcohol from which the hydroxyl group was removed.

According to this invention, it has been found that a variety of aryl-substituted aliphatic amines in which the aryl group is attached to a tertiary carbon can be prepared in one step by condensing an aromatic compound having a reactive hydrogen atom on one of the nuclear carbon atoms, directly with an amino tertiary alcohol in the presence of a stoichiometric excess of a condensing agent causing the tertiary hydroxyl group of the amino tertiary alcohol to condense with the reactive hydrogen of the aromatic compound and to be removed as water of condensation, whereby the resulting aryl radical attaches itself through its nuclear carbon atom to which was attached the reactive hydrogen atom, to the residue of the original amino tertiary alcohol at that carbon thereof to which there was originally attached the tertiary hydroxyl group. It is particularly advantageous to use at least three mols of the condensnig agent per mol of the aromatic compound having the reactive hydrogen. Especially good yields follow in those proportions, and particularly when aluminum chloride is the condensing agent.

The condensing agents suitable for bringing about this one step condensation of the aromatic compound having a reactive hydrogen with the amino tertiary alcohol are members of the Friedel-Crafts group and are those members of the Friedel-Crafts group which are selected from the halides of the solid elements. Thus, these suitable condensing agents include the aluminum halides, such as aluminum chloride, aluminum bromide and the like, while also included are the other metallic halides of the Friedel-Crafts group such as the other amphoteric metal halides as zinc chloride and stannic chloride.

Any aromatic compound having at least one reactive hydrogen atom attached to a ring carbon atom may be used as the aromatic compound starting material. Such suitable aromatic compound starting materials may be represented by the generic formula Ar·H in which Ar is a mononuclear or poly-nuclear aromatic hydrocarbon radical such as that of benzene, toluene, xylene, naphthene, and the like, or a substituted mononuclear or poly-nuclear aromatic hydrocarbon radical, for example, mono- or poly-halogen substituted as the fluoro-phenyl radical or chloro-phenyl radical as mono-chloro-phenyl or poly-chloro-phenyl radical such as a dichloro-phenyl radical as o-dichloro-phenyl, or m-dichloro-phenyl or p-dichloro-phenyl radical, or radicals similarly substituted by other halogens, for example, bromine, or mono- or poly-hydroxy substituted as the hydroxy-phenyl radical or dihydroxy-phenyl radical, and the radicals obtained by removing a hydrogen attached to a nuclear carbon of a substituted naphthalene such as from the alkyl-naphthalenes as the methyl-naphthalenes, or the halogen-substituted naphthalenes as chloro-naphthalene and the like or alkoxy-substituted aryl radicals such as methoxy-phenyl (derived from anisole), and the like.

Thus, the applicable aromatic compound starting material includes not only mono- and poly-nuclear aromatic hydrocarbons such as benzene, naphthalene and the like, but also aromatic compounds containing substituents on the aromatic nucleus, such as the alkylated aromatic compounds as the alkyl-benzenes such as toluene, xylene and the alkyl-naphthalenes as methyl-naphthalene and the like, and also includes the hydroxy-aromatic compounds as the mono- and poly-hydroxy-benzene, and also the alkoxy aromatic compounds as the alkoxy-benzenes, for example, anisole, and the alkoxy-naphthalenes, as well as the halogen substituted aromatic compounds as the halo-benzenes and the halo-naphthalenes.

The aliphatic residue of the amino tertiary alcohols suitable as starting materials according to the invention may be saturated or unsaturated and straight or branched chain. Thus, the amino tertiary alcohols suitable as starting materials in the process of the invention may be represented by the general formula

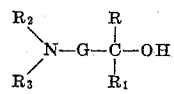

in which R and $R_1$ are each separately some alkyl radical, for example, methyl, ethyl, propyl, butyl, amyl, octyl, decyl and the like, or some aralkyl radical as benzyl, phenylethyl and the like; and in which G is a divalent radical selected from the class of $(CH_2)_m$,

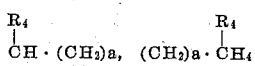

and $(CH_2)_b(HC=CH)(CH_2)_a$, in which $m$ is a whole number, and a and b are separately selected from zero and a whole number, and $R_2$, $R_3$ and $R_4$ may be selected from the class of hydrogen, alkyl and aralkyl radicals such as defined for R and $R_1$ above. Examples of such amino tertiary alcohols include 1-amino-2-methyl-2-propanol, 1-methylamino-2-methyl-2-propanol, 1-ethylamino-2-methyl-2-propanol, 1-benzylamino-2-methyl-2-propanol, 2-amino-3-methyl-3-butanol, 2-methylamino-3-methyl-3-butanol, 2-amino-2-methyl-3-methyl-3-butanol, 2-methylamino-2-methyl-3-methyl-3-butanol, 2-ethylamino-2-methyl-3-methyl-3-butanol, 2-benzylamino-2-methyl-3-methyl-3-butanol, 2-ethylamino-3-methyl-3-butanol, 2-benzylamino-3-methyl-3-butanol, and the like.

The invention may be illustrated by, but not restricted to, the following examples:

*Example 1. Preparation of beta,beta-dimethyl-phenethylamine.*—To a cooled, well-stirred mixture of 80 grams (0.6 mol) of anhydrous aluminum chloride and 78 grams (1 mol) of benzene was added 17.8 grams (0.2 mol) of 1-amino-2-methyl-2-propanol, or $(CH_3)_2C(OH)CH_2NH_2$. Much heat evolved. The mixture was then stirred and refluxed for three hours and then allowed to stand overnight and thereafter poured on ice. The benzene layer was extracted with dilute hydrochloric acid and this extract was combined with the aqueous layer and the resulting solution was then made strongly alkaline. The amine which separated was taken up in ether and the ethereal solution was dried and distilled. The fraction distilling 89–90° C. at 10 mm. weighed 26 grams, corresponding to an 87% yield of beta,beta-dimethyl-phenethylamine. The phenylthiourea of this amine melted at 106–106.5° C.

*Example 2. Beta,beta - dimethyl - phenethyl - methylamine.*—By replacing the 1-amino-2-methyl-2-propanol of Example 1 by stoichiometrically equivalent amount of 1-methylamino-2-methyl-2-propanol, or $(CH_3)_2C(OH)CH_2NHCH_3$, and following generally the procedure of Example 1, there was obtained as the fraction distilling at 92–92.5° C. at 11 mm. a 78% yield of beta,beta-dimethyl-phenethyl-methylamine.

*Example 3. Preparation of beta,beta-dimethyl-phenethyl-ethylamine.*—By replacing the 1-amino-2-methyl-2-propanol of Example 1 by the stoichiometrically equivalent amount of 1-ethylamino-2-methyl-2-propanol, or $$(CH_3)_2C(OH)CH_2NHC_2H_5$$

and following generally the procedure of Example 1, there was obtained as the fraction distilling at 96–98° C. at 11 mm. an 86% yield of beta,-beta-dimethyl-phenethyl-ethylamine, the hydrochloride of which melted at 191.5–192.5° C.

*Example 4. Preparation of beta-beta-dimethyl-alpha-methyl-phenethylamine.*—By replacing the 1-amino-2-methyl-2-propanol of Example 1 by the stoichiometrically equivalent amount of 2-amino-3-methyl-3-butanol.

$$(CH_3)_2C(OH)CH(NH_2)CH_3$$

and following generally the procedure of Example 1, there was obtained as the fraction distilling at 100–102° C. at 10 mm. a 63% yield of beta,beta-dimethyl-alpha-methyl-phenethylamine, the hydrochloride of which melted at 214–215° C.

*Example 5. Preparation of beta,beta-dimethyl-alpha-methyl-phenethyl-methylamine.*— By replacing the 1-amino-2-methyl-2-propanol of Example 1 by the stoichiometrically equivalent amount of 2-methylamino-3-methyl-3-butanol, or $(CH_3)_2C(OH)CH(NHCH_3)CH_3$ and following generally the procedure of Example 1, there was obtained as the fraction distilling at 99–100.5° C. at 9 mm. a 63% yield of beta,beta-dimethyl-alpha-methyl-phenethyl-methylamine, the hydrochloride of which melted at 230–231° C.

*Example 6. Preparation of beta,beta-dimethyl-alpha,alpha-dimethyl-phenethylamine.* — By replacing the 1-amino-2-methyl-2-propanol of Example 1 by the stoichiometrically equivalent amount of 2-amino-2-methyl-3-methyl-3-butanol, or $(CH_3)_2C(OH)C(NH_2)(CH_3)_2$, and following generally the procedure of Example 1, there was obtained as the fraction distilling at 123–126° C. at 14 mm. a 73% yield of beta,beta-dimethyl-alpha,alpha-dimethyl-phenethylamine, the hydrochloride of which melted at 207–210° C.

By replacing the 1-amino-2-methyl-2-propanol in Example 1 by any other amino tertiary alcohol or substituted-amino tertiary alcohol such as any of those specifically identified hereinabove in the paragraph describing the nature of the amino tertiary alcohols which may be used in the process of the invention or any other amino tertiary alcohol or substituted-amino tertiary alcohol embraced within the scope therein described, and following generally the procedure of Example 1, there are obtained the corresponding phenethylamines, including those dialkyl-substituted at the beta-carbon, those alkyl-substituted on the nitrogen as well as dialkyl-substituted on the beta-carbon, and those dialkyl-substituted at both the alpha- and the beta-carbon atoms.

The starting amino tertiary alcohols specifically employed in the various examples were prepared by the action of ammonia or the corresponding amine upon the proper ethylene oxides as illustrated in the Journal of the American Chemical Society, volume 63, page 1034 (1941); Chemical Abstracts, volume 2, page 2548 (1908) and volume 24, page 1083 (1930).

The process of this invention is useful in preparing aryl-substtiuted aliphatic amines, in which the ryl group is attached to a tertiary carbon.

While the invention has been illustrated by certain specific embodiments thereof, it is understood that many substitutions, variations and modifications may be made therein within the scope indicated by the appended claims.

This application is a continuation-in-part of my copending application Serial No. 479,875, filed March 20, 1943, now abandoned.

What is claimed is:

1. The preparation of an arylaliphatic amine having its aryl group linked to a tertiary carbon, which preparation comprises reacting, in the presence of a substantially anhydrous aluminum halide, (1) an aromatic compound, having a replaceable hydrogen linked to at least one of its nuclear carbons, which is a member of the group consisting of benzene, naphthalene, alkyl-benzenes, alkyl-naphthalenes, alkoxy-benzenes, alkoxy-naphthalenes, hydroxy-benzenes, hydroxy-naphthalenes, halo-benzenes, and halo-naphthalenes, directly with (2) an amino tertiary alcohol which is a member of the group consisting of the propanols and the butanols, and having the general formula

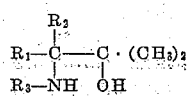

in which $R_1$ and $R_2$ are separately and independently selected from hydrogen and alkyl radicals, and R₃ is selected from hydrogen, and alkyl and aralkyl radicals.

2. The preparation of an arylaliphatic amine, as claimed in claim 1, in which there is used over two mols of the aluminum halide per mol of the amino, tertiary alcohol.

3. The preparation of an arylaliphatic amine, as claimed in claim 1, in which there is used about three mols of the aluminum halide per mol of the amino, tertiary alcohol.

4. The preparation of an arylaliphatic amine as claimed in claim 1 wherein the aluminum halide is aluminum chloride.

5. The preparation of a phenylaliphatic amine as claimed in claim 1, wherein the aluminum halide is aluminum chloride and there is used about three mols of it per mol of the amino, tertiary alcohol.

6. The preparation of beta,beta-dimethyl-phenethylamine, which comprises reacting benzene with 1-amino-2-methyl-2-propanol, in the presence of about 3 mols of substantially anhydrous aluminum chloride per mol of the amino-propanol.

7. The preparation of beta,beta-dimethyl-phenethyl-methylamine, which comprises reacting benzene with 1-methylamino-2-methyl-2-propanol, in the presence of about 3 mols of substantially anhydrous aluminum chloride per mol of the amino-propanol.

8. The preparation of beta,beta-dimethyl-alpha-methyl-phenethylamine, which comprises reacting benzene with 2-amino-3-methyl-3-butanol, in the presence of about 3 mols of substantially anhydrous aluminum chloride per mol of the amino-butanol.

CHESTER M. SUTER.

REFERENCES CITED

The following references are of record in the file of this patent:

Braun, Ber. Deut. Chem. Ges., vol. 49 (1916), p. 2620.
Chem. Absts., vol. 16 (1922), p. 2857.
Chem. Absts., vol. 18 (1924), p. 3182.
Chem. Absts., vol. 33 (1939), col. 972.
Chem. Absts., vol. 33 (1939), cols. 6233–6234.

Certificate of Correction

Patent No. 2,443,206. June 15, 1948.

CHESTER M. SUTER

It is hereby certified that errors appear in the printed specification of the above numbered patent requiring correction as follows: Column 1, line 39, for "condensnig" read *condensing*; column 3, line 24, after the word "heat" insert *was*; line 32, for "etheral" read *ethereal*; line 56, for "beta,-beta-" read *beta,beta-*; line 59, for "*beta-beta-*" read *beta,beta-*; line 63, after "butanol" strike out the period and insert instead a comma; column 4, line 43, for "substtiuted" read *substituted*; line 44, for "ryl" read *aryl*; and that the said Letters Patent should be read with these corrections therein that the same may conform to the record of the case in the Patent Office.

Signed and sealed this 2nd day of November, A. D. 1948.

[SEAL]

THOMAS F. MURPHY,
*Assistant Commissioner of Patents.*